O. C. DORNEY.
TEMPLE FASTENER.
APPLICATION FILED MAR. 29, 1918.
1,284,071.
Patented Nov. 5, 1918.
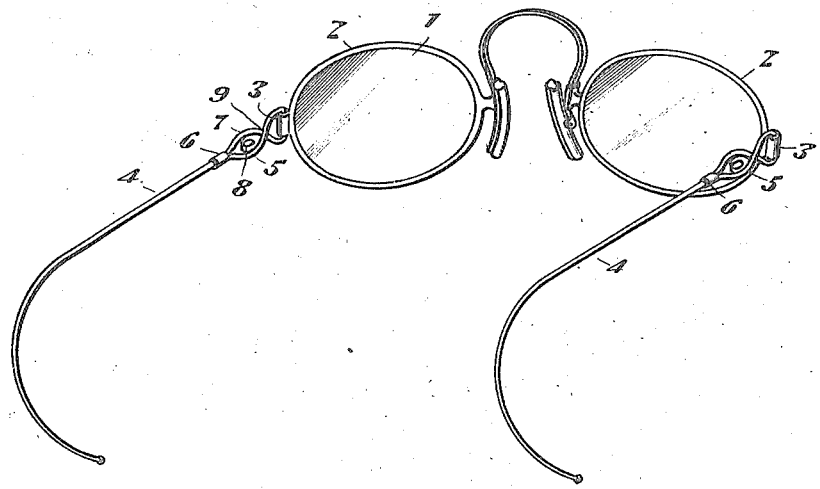
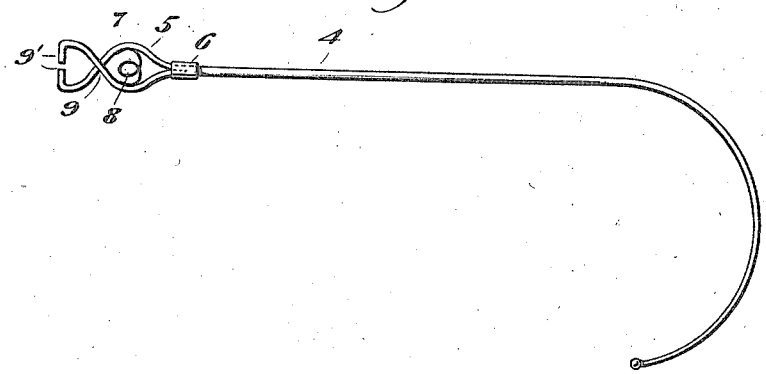
Witnesses
Inventor
O. C. Dorney
By Victor J. Evans
Attorney

UNITED STATES PATENT OFFICE.

OLIVER CHARLES DORNEY, OF ALLENTOWN, PENNSYLVANIA.

TEMPLE-FASTENER.

1,284,071. Specification of Letters Patent. Patented Nov. 5, 1918.

Application filed March 29, 1918. Serial No. 225,520.

*To all whom it may concern:*

Be it known that I, OLIVER CHARLES DORNEY, a citizen of the United States, residing at Allentown, in the county of Lehigh and State of Pennsylvania, have invented new and useful Improvements in Temple-Fasteners, of which the following is a specification.

This invention relates to fastening devices especially adapted to be used upon eye glass and spectacle temples for connecting them with the lenses and it consists in the novel features hereinafter described and claimed.

An object of the invention is to provide eye glass and spectacle temples with means adapted to be manipulated whereby the temples may be easily and quickly removed from the lenses and may be readily applied thereto and when in position thereon may swing with relation to the lenses in a usual manner.

With this object in view the invention includes a socket member which may be connected directly with the lenses or with a frame which retains them and the temples are provided at their ends with spring members having bowed portions which cross each other and being provided with oppositely disposed pintles adapted to enter the socket member at the opposite ends thereof. An additional spring is interposed between the bowed portions of the said spring members.

In the accompanying drawings:

Figure 1 is a perspective view of a pair of nose glasses with the detachable temples applied.

Fig. 2 is a detailed view of the features of the invention.

As illustrated in the accompanying drawing, the lenses 1 are of conventional form and constitute parts of nose glasses and may be retained in frames 2. Socket members 3 are connected with the outer portions of the lenses 1 by being applied to the frames 2 or in the event that frames are not employed by being attached directly to the outer portions of the lenses 1 in a usual manner.

Each temple 4 may engage behind the ears of a wearer in a usual manner and the temple is provided at one end with two spring members 5 which may be made by splitting the end portion of the temple 4 and by applying a band 6 at the end of the split in order to prevent the same from continuing into the body of the temple after the split has been properly cut and the members 5 formed. The members 5 are provided with oppositely disposed intermediate bowed portions 7 and a spring 8 is interposed between the said portions and bears at its opposite ends against them. The portions 7 cross each other as at 9 and the ends of the members 5 are inwardly disposed in alinement with each other forming pintles 9' adapted to enter the opposite end portions of the socket members 3 and which constitute in conjunction with the said socket members the hinge whereby the temple is connected with the lense or lense frame.

It is apparent that when the glasses are desired to be used as nose glasses or supported upon the bridge of the nose in a usual manner the temples are detached from the lenses by pressing the intermediate bowed portions 7 together whereby the ends of the pintles 9 are moved beyond the ends of the socket members 2 and consequently the temple 4 is released from the socket member. To apply the temple to the socket member the operation above described is reversed.

From the foregoing description taken in conjunction with the accompanying drawing it will be seen that a spectacle temple of simple and durable structure is provided and that the same may be easily and quickly attached to the lense of a glass or removed therefrom.

Having described the invention what is claimed is:

1. In combination with a socket member a temple provided at its end with oppositely disposed bowed portions which cross each other and which are provided with inwardly alined pintles adapted to enter the socket member.

2. In combination with a socket member a temple having resilient bowed portions which cross each other at points between their ends and which are provided at their ends with inwardly disposed alined pintles and a spring interposed between the bowed portions of the said members.

3. In combination with a socket member a temple having bowed portions which cross each other and provided with alined pintles, a spring interposed between the bowed portions and a band surrounding the temple at the ends of the bowed portions.

In testimony whereof I affix my signature.

OLIVER CHARLES DORNEY.